J. R. Cribbs,
Nut Lock.
No. 87,761.          Patented Mar. 16, 1869.
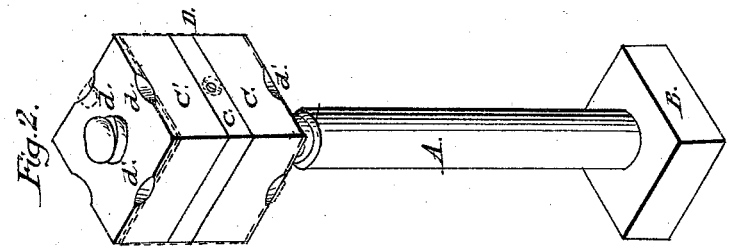
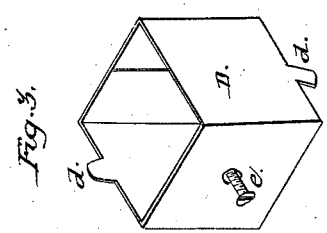
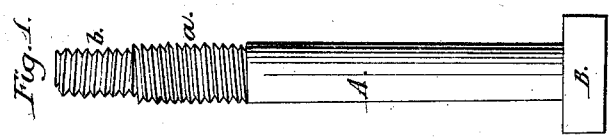
Witnesses:
Inventor:
John R. Cribbs
By N Crawford
Atty

JOHN R. CRIBBS, OF GARDNER, ILLINOIS.

*Letters Patent No. 87,761, dated March 16, 1869.*

IMPROVEMENT IN NUT-LOCK.

The Schedule referred to in these Letters Patent and making part of the same.

*To whom it may concern:*

Be it known that I, JOHN R. CRIBBS, of Gardner, in the county of Grundy, and State of Illinois, have invented a new and improved Screw-Bolt for bolting together compound or continuous railroad-rails, and for other purposes, where the nuts are liable to be accidentally turned off; and I hereby declare that the following is a full and exact description thereof, reference being had to the accompanying drawings, and to the letters of reference marked thereon.

The object of this invention is to prevent the nuts of screw-bolts from turning off of the bolt, by a continued jar or concussion, or by accident; and It consists in the use of a right and left-hand screw cut upon the bolt, and upon which two nuts are turned, one having a right-hand and the other a left-hand screw-thread cut therereon, a washer interposed between the nuts, and a lock or keeper surrounding both nuts.

To enable others skilled in the art to make and use my invention, I will describe its construction and operation.

Figure 1 represents a bolt, with a right and left screw-thread thereon.

Figure 2 is a bolt with the nuts and washer turned on.

Figure 3 is a perspective view of the lock, or keeper.

A, in the drawings, represents a common screw-bolt, having head B, and right and left screw-threads $a$ and $b$ thereon.

$a$ is the right-hand screw-thread, and is larger in diameter than that of the left-hand thread, $b$, so as to allow the nut $c$ freely to slip over the thread $b$.

C is the nut, with a right-hand screw-thread in it, and turns upon thread $a$.

C' is a nut, with a left-hand screw-thread, and is turned upon the thread $b$ of the bolt.

The screw-threads on the bolt may be cut the reverse from what is shown, and have the threads in the nuts cut to fit the thread on the bolt.

D is a metal keeper, or lock, which slips on over the nuts C C', when they are in position. This metal keeper may be of cast or sheet-metal, and have ears $d$, as seen in fig. 3, which, when the nuts are in the right position, will be coincident to the depression $d'$ $d'$ in the nuts C C', and can be turned down into such depressions, which will perfectly secure the two nuts, and hold them in their position, and prevent either from turning.

$c$ is the washer interposed between the nuts C C', for the purpose of holding the keeper D in place when the ears $d$ are not used. This washer may be of wood, metal, or leather, so that the screw $e$ will pass through keeper D into washer $c$. Either of these methods will perfectly secure the keeper upon the nuts, and prevent their being turned off, unless the keeper is first removed, and then the nuts, by turning them in opposite directions, will release the bolt.

A bolt thus constructed, with the screw-threads and nuts, and held in position by the keeper, will perfectly secure the safety of the hold the bolt has, against any tendency by a continuous jar, such as a train of cars will produce in passing over the rails, and prevent the nuts from turning off, or becoming loose, so as to rattle.

The bolt is constructed so that the screw-thread will allow nut C to be turned hard up against whatever is to be held. Then washer $c$ is placed over the bolt, and against nut C, when nut C' is turned on in the reverse direction from nut C, and hard against washer $c$, and so as to be coincident therewith, when keeper D is placed over the nuts, and the screw $e$ turned home into washer $c$, or the ears $d$ are bent into depressions $d'$ $d'$, which will, as before stated, perfectly secure the nuts in place, and prevent their running off.

I am aware that screw-bolts, with screw-threads thereon, having a right and left-hand direction, with nuts to fit such screw-threads, have been in use. Such screw-bolt I do not alone claim; nor do I claim nuts having a right and left-hand screw-thread: but having described my invention, What I do claim, and desire to secure by Letters Patent, is—

1. The combination of the screw-bolt A, having screw-threads $a$ $b$, nuts C C', with the washer $c$, keeper D, and screw $e$, all constructed to operate substantially as described.

2. The combination of the screw-bolt A, nuts C C', with keeper D, ears $d$, depressions $d'$ $d'$, and with or without washer $c$, and screw $e$, substantially as described.

JOHN R. CRIBBS.

Witnesses:
HENRY M. MYGATT,
JAMES P. LAIRD.